United States Patent [19]

Wittmann et al.

[11] Patent Number: 4,508,884

[45] Date of Patent: Apr. 2, 1985

[54] OXYGEN PERMEABLE HARD CONTACT LENS

[75] Inventors: Joseph W. Wittmann, Rochester; John M. Evans, Greece, both of N.Y.

[73] Assignee: CooperVision, Inc., Scottsville, N.Y.

[21] Appl. No.: 497,929

[22] Filed: May 25, 1983

[51] Int. Cl.$^3$ ............................................. C08F 30/08
[52] U.S. Cl. ............................... 526/279; 351/160 R; 351/160 H; 528/32
[58] Field of Search ................... 526/279; 351/160 R, 351/160 H; 528/32

[56] References Cited

U.S. PATENT DOCUMENTS

| | | | |
|---|---|---|---|
| 3,940,353 | 2/1976 | Mortarano | 523/523 |
| 4,168,112 | 9/1979 | Ellis et al. | 427/164 |
| 4,259,467 | 3/1981 | Keogh et al. | 526/279 |
| 4,260,725 | 4/1981 | Keogh et al. | 526/279 |
| 4,314,068 | 2/1982 | Novicky | 556/440 |
| 4,355,147 | 10/1982 | Deichert et al. | 526/279 |
| 4,365,074 | 12/1982 | Novicky | 556/442 |
| 4,400,333 | 8/1983 | Neefe | 523/107 |
| 4,410,674 | 10/1983 | Ivani | 526/279 |
| 4,414,375 | 11/1983 | Neefe | 526/260 |
| 4,419,505 | 12/1983 | Ratkowski et al. | 526/279 |
| 4,424,328 | 1/1984 | Ellis | 526/279 |

FOREIGN PATENT DOCUMENTS

| | | |
|---|---|---|
| 2009189 | 6/1979 | United Kingdom . |
| 2014591 | 8/1979 | United Kingdom . |
| 2017336 | 10/1979 | United Kingdom . |
| 2117387 | 10/1983 | United Kingdom . |
| 2119951 | 11/1983 | United Kingdom . |

OTHER PUBLICATIONS

WO84/00968, WO84/00969, PCT, Whitford et al., Mar. 15, 1984.

Primary Examiner—Melvyn I. Marquis
Attorney, Agent, or Firm—Pollock, Vande Sande & Priddy

[57] ABSTRACT

Oxygen permeable hard contact lenses from the copolymerization of ethylenically unsaturated silicone ester; sterically hindered or bulky aliphatic ester of ethylenically unsaturated carboxylic acid, and hydrophilic monomer; and method for the polymerization thereof.

20 Claims, No Drawings

OXYGEN PERMEABLE HARD CONTACT LENS

TECHNICAL FIELD

The present invention is concerned with novel hard contact lenses having good oxygen permeability, good physical characteristics and good optical properties. In particular, the present invention is concerned with novel hard contact lenses from certain polymerizable silicone esters and certain esters of ethylenically unsaturated carboxylic acids.

BACKGROUND ART

Presently, contact lenses are constructed of certain types of plastic materials. For instance, commercial hard or essentially semirigid contact lenses are predominantly made from polymethylmethacrylate. However, this material is not completely satisfactory because of its poor gas permeation characteristics. This, in turn, induces edema on the surface of the cornea in the region covered by the contact lens and thereby resulting in complications and poor vision.

In order to overcome this problem of insufficient gas permeability, it has been suggested to provide contact lenses from various polymerizable silicone esters. These suggested contact lenses also include methyl methacrylate and/or certain other volatile esters of methacrylic acid and/or of acrylic acid.

Usually, rods of material from which these types of contact lenses can be lathed are prepared in capped tubes to prevent the loss of the volatile monomers during polymerization. Furthermore, these mixtures are polymerized over long periods of time in stages from low to more elevated temperatures to prevent the loss of the more volatile monomers. A problem with this method of material preparation has been that the material is not homogeneous throughout the length of the rod. Furthermore, undesirable side products can result from long polymerization times.

U.S. Pat. Nos. 3,808,178 and 4,120,570 to Gaylord suggest contact lenses fabricated from a copolymer of a polysiloxanylalkyl acrylic ester and an alkyl acrylic ester or alkyl methacrylate ester. It is reported that the copolymer has increased oxygen permeability. Wettability can be imparted to the copolymer by the addition of about 0.1 to about 10% by weight of one or more hydrophilic monomers such as hydroxyalkyl acrylates and methacrylates, acrylic and methacrylic acid, acrylamide, glycidyl acrylate and N-vinyl pyrrolidione.

The polysiloxanylalkyl acrylic esters suggested by Gaylord include those required by the present invention.

U.S. Pat. Nos. 4,152,508 and 4,330,383 to Ellis, et al. suggest hard contact lenses reportedly having high permeability obtained from a copolymerizing siloxanylalkyl ester with an ester of acrylic or methacrylic acid. In addition, in order to obtain improved physical characteristics over the materials suggested by Gaylord in U.S. Pat. Nos. 3,808,178 and 4,120,570 it is necessary, according to Ellis, et al. to employ an itaconate ester in the copolymerization. Representatives of itaconate esters include phenyl itaconate, diphenyl itaconate, methyl phenyl itaconate, and dimethyl itaconate.

U.S. Pat. No. 4,355,147 to Deichert, et al. suggests hard contact lenses by copolymerizing in certain relative amounts, polysiloxane monomers which must be α, ω terminally bonded through divalent hydrocarbon groups to an activated unsaturated group; certain polycyclic acrylates or methacrylates; and a member selected from the group consisting of hydroxyethylmethacrylate, hydroxyethylacrylate, hydroxypropylmethacrylate, hydroxypropylacrylate, and mixtures thereof. Although the polycyclic acrylates or methacrylates suggested by Deichert, et al. include those required by the present invention, the polyfunctional polysiloxanes required therein are entirely different from those required by the present invention.

U.S. Pat. No. 4,327,203 to Deichert, et al. suggests contact lenses from the copolymerization of monomeric polysiloxanes endcapped with unsaturated groups; cycloalkyl acrylate or methacrylate, and a tear film stabilizer such as hydroxyethylmethacrylate, hydroxypropylmethacrylate, hydroxyethylacrylate, and hydroxypropylacrylate.

U.S. Pat. Nos. 4,153,641; 4,189,546; 4,208,506; and 4,341,889 to Deichert, et al. suggest compositions suitable for fabricating contact lenses by polymerizing certain difunctional siloxane materials.

U.S. Pat. Nos. 4,254,248; 4,276,402; and 4,277,595 suggest soft hydrophilic contact lenses obtained by copolymerizing certain difunctional siloxane materials and various cyclic esters of acrylic or methacrylic acid.

U.S. Pat. Nos. 4,242,483 and 4,306,042 suggest contact lenses fabricated from copolymerizing certain siloxanyl alkyl esters.

U.S. Pat. No. 4,139,513 suggests soft contact lenses from copolymerizing certain siloxanes.

The following patents also suggest contact lenses containing a siloxane: U.S. Pat. Nos. 4,062,627, 4,343,927, 3,808,179, 4,246,389, 4,182,822, 4,235,985, 4,138,382, 4,139,548, 4,139,692, 3,916,033, 4,248,989, 4,303,772, 4,242,483, 4,216,303, 4,245,069.

U.S. Pat. Nos. 3,681,298; 3,940,353; and 3,716,524 suggest copolymers from isobornyl methacrylate.

SUMMARY OF INVENTION

The present invention provides hard contact lenses having high oxygen permeability. In addition, the contact lenses obtained by the present invention have good wettability permitting tear fluid to adequately coat the lenses when in place in the eye. Moreover, the present invention provides hard contact lenses which possess good physical characteristics including good dimensional stability, sufficient hardness to allow lathing of lenses and good recovery or resilience of the lenses. Furthermore, the present invention makes it possible to readily and consistently reproduce lenses of the same or similar properties from batch to batch.

In addition, the monomers employed according to the present invention are such that the general volatility of the mixture does not present an obstacle or problem in the polymerization process. In fact, the monomeric mixtures employed in accordance with the present invention can be polymerized in an open vessel such as a polymeric mold using either ultraviolet or thermal means of polymerization. The periods of time involved in polymerization of the mixtures employed in the present invention are considerably shorter than practiced in preparing prior art contact lenses.

The contact lenses of the present invention are obtained from the copolymerization of (a) about 9 to 90% by weight of a monofunctional silicone ester of an ethylenically unsaturated carboxylic acid;

(b) 5 to 90% by weight of a sterically hindered nonvolatile or bulky aliphatic nonvolatile ester of an ethylenically unsaturated carboxylic acid;
(c) about 1 to 30% by weight of a hydrophilic monomer;
(d) about 0 to 20% by weight of a crosslinking agent; and
(e) 0 to 20% by weight of a $C_2$–$C_{20}$ straight or branched chained aliphatic ester of an ethylenically unsaturated carboxylic acid.

Normally, the polymerization is carried out with a photoinitiator or a thermal free radical initiator in the amounts of 0.01 to 2% by weight at a reaction temperature from 25° to 140° C. over a period of 1 to 7 hours.

The polymerization can be carried out in open vessels or molds.

BEST AND VARIOUS MODES FOR CARRYING OUT INVENTION

The contact lenses of the present invention are obtained from copolymerization of a composition containing about 9 to 90% by weight, preferably, about 40 to 60% by weight and most preferably, about 40 to 50% by weight of a monofunctional silicone ester of an ethylenically unsaturated carboxylic acid. The silicone ester is monofunctional in that it contains only one ethylenically unsaturated polymerizable group.

The carboxylic acids from which the silicone esters can be obtained are preferably aliphatic, monocarboxylic, and monoethylenic. Examples of suitable ethylenically unsaturated acids are acrylic acid, methacrylic acid, and crotonic acid. Mixtures of silicone esters can be employed when desired.

Examples of some suitable silicone esters are represented by the following formula I:

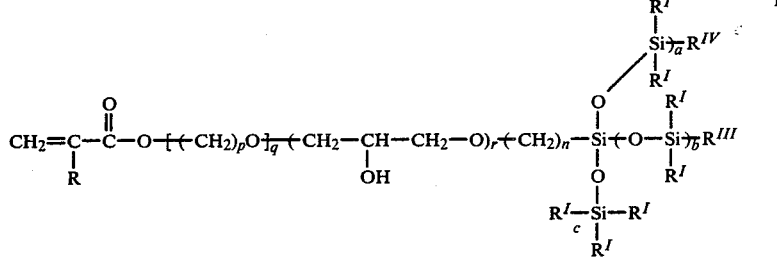

wherein R is hydrogen or methyl; each $R^I$ individually is methyl, or O—$^{II}$; each $R^{II}$ individually is methyl or phenyl; $R^{III}$ is methyl or phenyl and $R^{IV}$ is methyl or phenyl; or $R^{III}$ and $R^{IV}$ together form a bond with a bridging —O— between the Si atom and the $R^{III}$ to form a cyclic ring; each a, b, and c individually is an integer of 0–3; p is an integer of 2–4; q is an integer of 0–10; n is an integer of 1–3; and r is an integer of 0–1.

Preferred silane monomers falling within the scope of formula I are represented by the following formula II:

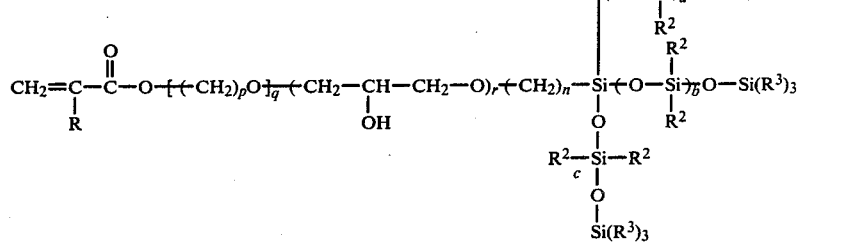

wherein R is H or methyl; each $R^2$ individually is $CH_3$, phenyl or O—$Si(CH_3)_3$; each $R^3$ individually is $CH_3$ or phenyl; each a, b, and c individually is an integer of 0–3; p is an integer of 2–4; q is an integer of 0–20; n is an integer of 1–3; and r is an integer of 0–1.

Examples of some suitable compounds of Formula I above are:

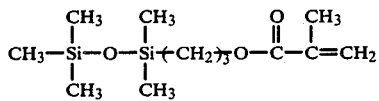

γ-Pentamethyldisiloxanylpropyl methacrylate,

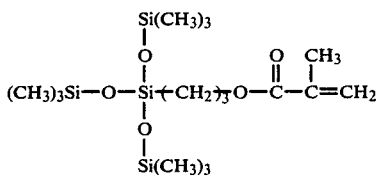

Tris [trimethylsiloxy]-α-methacryloxypropylsilane

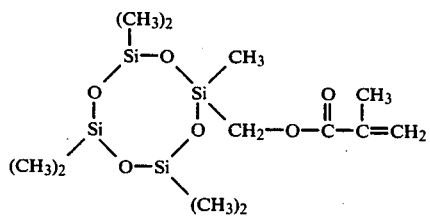

Heptamethylcyclotetrasiloxanyl methyl methacrylate,

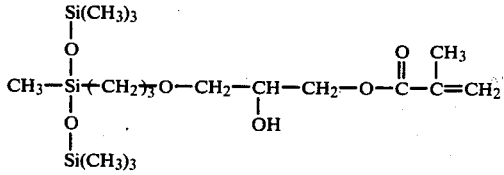

Methyldi(trimethylsiloxy)sylylpropylglycerol methacrylate,

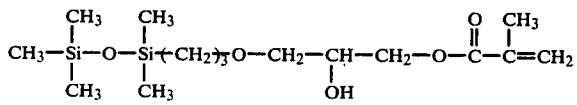

Pentamethyldisiloxanyl (propylglycerol) monomethacrylate, and

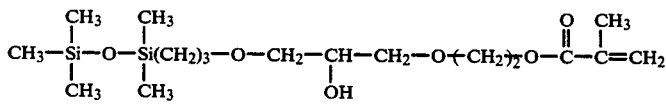

Pentamethyldisiloxanyl (propylglycerol) ethyleneglycol monomethacrylate.

Also included in the polymerizable composition is about 5 to 90% by weight, preferably about 10 to 40%, and most preferably, about 15 to 35% of a sterically hindered ester of an ethylenically unsaturated carboxylic acid or a bulky aliphatic ester of an ethylenically unsaturated carboxylic acid. The carboxylic acids are preferably aliphatic, monocarboxylic acids. The carboxylic acids are preferably aliphatic, monocarboxylic, and monoethylenic and include acrylic acid, methacrylic acid, and crotonic acid. Examples of suitable esters include isoboronyl methacrylate, isobornyl acrylate, isobornyl crotonate, dicyclopentadienyl methacrylate, dicyclopentadienyl acrylate, dicyclopentadienyl crotonate, isopinocamphyl acrylate, isopinocamphyl methacrylate, isopinocamphyl crotonate, t-butylcyclohexyl methacrylate, t-butyl cyclohexyl acrylate, t-butylcyclohexyl crotonate, 3,3,5-trimethylcyclohexyl methacrylate, 3,3,5-trimethylcyclohexyl acrylate, 3,3,5-trimethylcyclohexyl crotonate, neopentyl methacrylate, neopentyl acrylate, and neopentyl crotonate, with the preferred esters being the isobornyl esters. Mixtures can be employed when desired. The primary function of these monomers is to increase the $O_2$ permeability over the use of other methacrylates, acrylates, or crotonates. It is believed that because of the relative bulkiness of the pendant groups of these esters, the resulting copolymer has a decreased density and more "open structure" as compared to copolymers obtained from other types of methacrylates, acrylates, or crotonates. Moreover, the bulky polycyclic esters and preferably the isoboronyl esters enhance the hardness and dimensional stability of the copolymer probably because of the high degree of hardness and high glass transition temperatures of the homopolymers of such esters.

The polymerizable compositions also include at least one hydrophilic monomer for wetting. Examples of suitable hydrophilic monomers are 2-hydroxyethyl acrylate, 2-hydroxyethyl methacrylate, acrylic acid, methacrylic acid, N-vinyl pyrrolidone, maleic anhydride, acrylamide, methacrylamide, N,N-dimethylacrylamide, N,N-dimethylmethacrylamide, glyceryl acrylate, glyceryl methacrylate, dimethylaminoethyl methacrylate, dimethylaminoethyl acrylate, polyethyleneglycol monoacrylates and polyethylene glycol monomethacrylates and their corresponding methyl ethers and maleic anhydride. These hydrophilic monomers are incorporated into the composition in amounts of about 1 to 30% by weight, preferably amounts of about 1 to 20% by weight, and most preferably, about 2 to 15% by weight. The preferred hydrophilic monomer is N-vinyl pyrrolidone. Mixtures of hydrophilic monomers can be employed if desired.

The compositions can also contain di or polyethylenically unsaturated crosslinking agents. Examples of some crosslinking agents are acrylate or methacrylate diesters of di or polyhydric alcohols or of phenols such as ethylene glycol diacrylate, ethylene glycol dimethacrylate; 1,6-hexandiol diacrylate, 1,6-hexandiol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, polyethylene glycol dimethacrylate, polyethylene glycol diacrylate, bisphenol A diacrylate, bisphenol A dimethacrylate, ethoxylated bisphenol A diacrylate, ethoxylated bisphenol A dimethacrylate, pentaerythritol triacrylate, pentaerythritol tetraeacrylate, pentaerythritol trimethacrylate, pentaerythritol tetramethacrylate, trimethylolpropane triacrylate, trimethylolpropane trimethacrylate, tripropylene glycol diacrylate, tripropylene glycol dimethacrylate; acrylamides such as methylene bisacrylamide, methylene bismethacrylamide, hexamethylene bisacrylamide, hexamethylene bismethacrylamide, and divinyl or diallyl esters such as divinyl benzene, diallyl phthalate, diallyl isophthalate, diallyl maleate, diallyl fumarate, and diallyl itaconate. When employed, the crosslinking agent is present in amounts of 1 to 20% by weight, preferably about 2 to 15% by weight, and most preferably, about 5 to 15% by weight. Mixtures of crosslinking agents can be employed if desired.

Also, $C_2$–$C_{20}$ straight or branched aliphatic mono- or diesters of an ethylenically unsaturated carboxylic acid can be incorporated into the compositions. Examples of such esters are ethyl, butyl, or isobutyl methacrylates or acrylates or crotonates, lauryl methacrylate or acrylate or crotonate, octyl methacrylate or acrylate or crotonate, 2-alkoxy ethyl methacrylate or acrylate or crotonate such as the methoxy or ethoxy derivatives, and dimethyl or diethyl maleate. These esters, if employed, are usually employed in amounts of about 1 to 20% by weight and preferably about 5 to 15% by weight. Mixtures of these esters can be employed if desired.

The polymerizable compositions of the present invention also include photoinitiators and/or photosensitizers. Examples of some photoinitiators are fluorenone, 4-nitrofluorene, 4-nitrobiphenyl, N-acetyl-4-nitro-1-naphthylamine, 2,3-dibenzoyloxirane, biacetyl, benzophenone, 9,10-phenanthrenequinone, xanthone; 9,10-anthraquinone, 3,3′,4,4′-benzophenone tetracarboxylic dianhydride, 5,5′-diphenyl dithiocarbonate, thioanthone, 2-chlorothioxanthane, benzoin ethers, such as methyl, ethyl, butyl, propyl, isopropyl, and the higher homologs, benzoin, deoxybenzoin, benzil, α-methoxy-α-phenylacetophenone, α,α-dimethoxy-α-phenylacetophenone; α,α-diethoxyacetophenone; benzoquinone, tetramethyldiaminobenzophenone (Michler's Ketone), 0-acylated α-oximinoketones, such as 1-phenyl-1,2-propanedione-2-0-benzoylamine, combinations of quinoline-8-sulfonyl chloride and thioxanthone with the latter being the photosensitizer, aromatic disulfides such as β,β′-dinaphthyl disulfide and diphenyl disulfide, acetophenone, and derivatives thereof such as 2-chloroacetophenone, p-t-trichloroacetophenone, 2-bromoacetophenone, 2-phenyl acetophenone, 4-methoxybenzophenone, 4-chlorobenzophenone, benzaldehyde, and 4,4′-dimethylbenzophenone.

Additional photoinitiators include compounds represented by the following structural formulas:

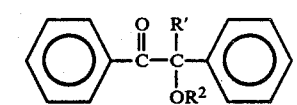

wherein X is a halogen such as Cl or Br; and each R individually is a halogen such as Cl or Br, H, phenyl or an alkyl containing 1 to 12 carbon atoms.

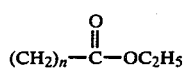

wherein R′ is H, CH$_2$OH, alkyl of 1 to 12 carbon atoms, phenyl, CH$_2$—O—tosyl, $$(CH_2)_n—\overset{O}{\overset{\|}{C}}—OC_2H_5$$

wherein n is 1 or 2, or CH$_2$CH=CH$_2$, and R$^2$ is H, alkyl of 1 to 12 carbon atoms, phenyl or Si(CH$_3$)$_3$. N-alkyl benzophenone-4-carboxylic acid esters of the formula:

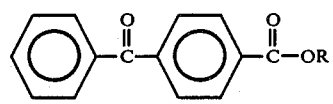

wherein R is alkyl of 1 to 12 carbon atoms;

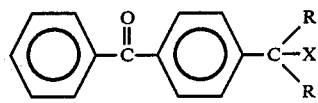

wherein X is a halogen such as Cl or Br, and each R individually is a halogen, such as Cl or Br, H or alkyl of 1 to 12 carbon atoms. Desyl aryl sulphides of the formula:

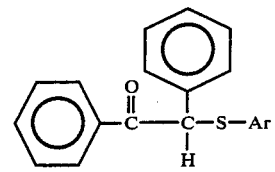

wherein Ar is phenyl, O-tolyl, p-tolyl, p-anisyl, or B-naphthyl; and including phenyl phenacyl sulphide;

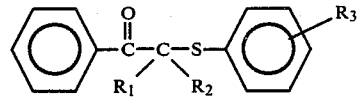

wherein R$_1$ and R$_2$ individually is H, phenyl, or alkyl of 1 to 12 carbon atoms, and R$^3$ is H or p-Cl, and a preferred example of which is when each of R$_1$ and R$_2$ is H;

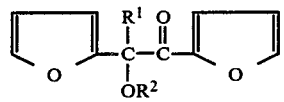

wherein R$^1$ and R$^2$ individually is H, phenyl, alkyl of 1 to 12 carbon atoms;

wherein Y is CH$_2$Cl or SO$_2$Cl;

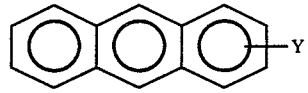

wherein Y is CH$_2$Cl or SO$_2$Cl;

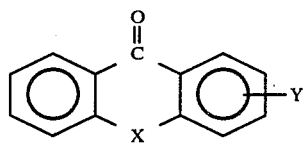

wherein Y is CH$_2$Cl or SO$_2$Cl; and X is CH$_2$, O, S, or

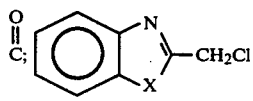

wherein X is O, S or NR and R is H or CH₃;

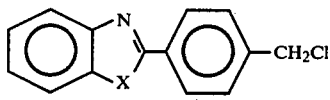

wherein X is O, S or NR and R is H or CH₃.

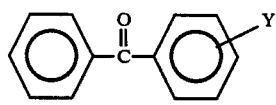

wherein Y is CH₂Cl or SO₂Cl;

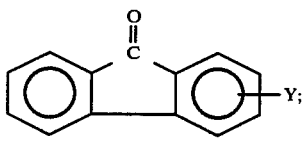

wherein Y is CH₂Cl or SO₂Cl

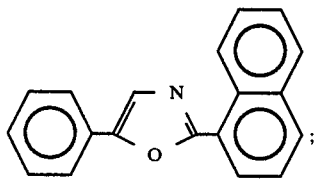

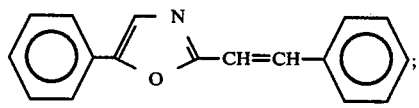

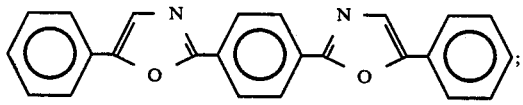

and

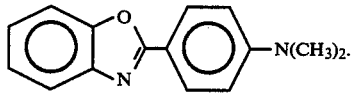

The photoinitiators are generally used in amounts of about 0.01 to 2% by weight, and preferably about 0.01 to 1% by weight.

Thermal free radical initiators may also be employed. Examples of such initiators are t-butyl peroctoate, dilauryl peroxide and azobisisobutyronitrile. These initiators are generally employed in amounts of about 0.01 to 2% by weight, and preferably about 0.01 to 1% by weight.

The non-volatile liquid compositions containing the above components are nitrogenated and degassed in an ultrasonic bath, followed by loading of these compositions into polymeric molds. Subsequently, the compositions are polymerized by subjecting them to irradiation by ultraviolet light (UV) or daylight fluorescent light in the range of about 200 to 800 nm. The use of UV in the range of about 200 to about 400 nm is preferred. An ultraviolet source providing an intensity of 0.01 to $6.0 \times 10^3$ μW/cm² at about 3.0 to 30.0 cm has been found suitable. The amount of time of the exposure to the radiation is about 0.01 to 24 hours, and preferably about 0.1 to about 15 hours. The exposure is carried out at room temperature.

The composition is then subjected to elevated temperatures of 80° to 140° C., preferably 80° to 120° C., followed by slow cooling to room temperature. The composition is heated at an elevated temperature for about 1 to 7 hours, preferably for about 1 to 3 hours.

Thermal free radical initiation may also be carried out; however, this means of initiation is not advantageous over photochemical initiation since the rate of initiation is slower, and longer cure times are involved. When thermal free radical initiation is carried out, temperatures of about 60° to 140° C. are generally employed followed by slow cooling to room temperatures. The times involved are generally from about 10A–24 hours at about 60° or 70°, followed by about 2–7 hours at more elevated temperatures.

Thus, one advantage of photochemical initiation over thermal initiation as presently practiced, is the faster rate of initiation, thereby shortening the cure time of the system. Another benefit achieved by using photochemical initiation is that open vessels such as open polymer molds rather than capped molds or capped tubes as previously practiced, may be used to effect the polymerization.

A further advantage to be achieved by photochemical initiation of the composition employed herein is the preparation of small volumes of material which are similar to each other rather than those prepared in large volumes such as long rods, and then slicing to give blanks. Accordingly, more reproducible lenses can be prepared by photochemical means with the polymerizable compositions employed herein.

A further advantage of the present invention is that the lenses do not require the presence of a filler and, preferably, do not include such.

The following non-limiting examples are presented to further illustrate the present invention:

EXAMPLES 1 TO 5

Hard, O₂ permeable contact lenses are made from a polymerizable mixture containing isobornyl methacrylate (IBMA), N-vinyl pyrrolidone (VP), tris(trimethylsiloxy)-α-methacryloxypropylsilane (TRIS), isobutyl methacrylate (IBuMA), tetraethylene glycol dimethacrylate (TEGDMA) or diethylene glycol dimethacrylate (DEGDMA) or ethylene glycol dimethacrylate (EGDMA) and using benzoin methyl ether (BME) as a photoinitiator. The components are mixed, nitrogenated and degassed on an ultrasonic bath. Then the compositions are carefully transferred to an open vessel such as a polyolefin mold. The molds are placed under a long wave UV lamp at a distance of 6 to 7 cm* from the lamp for a period of 15 minutes, followed by heating at 80° C. for 4 hours and at 120° C. for 2½ hours and slow-cooled to room temperature. Suitable contact lenses are obtained from buttons of the polymerized material from the molds. The composition and physical properties of these lenses are given in Table 1. All lenses are transparent and colorless.
*(rated at 20 to 25×10² μW/cm²).

EXAMPLES 6 TO 8

Following the experimental procedure of Examples 1–5 permeable hard contact lenses are made from the same compositional mixture except that multi-functional cross-linkers are substituted for the difunctional ones employed in Examples 1 to 5. The composition and physical properties of the lenses obtained from these compositions are given in Table 2. All lenses are transparent and colorless.

EXAMPLES 9 TO 11

Following the experimental procedure of Examples 1–5 permeable hard contact lenses can be made from the same compositional mixture as given by Example 3, Table 1, except that the concentration of BME is changed. This modification and physical properties of the lenses obtained from these compositions are given in Table 3. All lenses are transparent and colorless.

As seen in Table 3, a 0.02% by weight of BME is effective, although the deflection temperature underload decreases as the BME concentration decreases.

The above examples show that generally hard contact lenses can be obtained with good physical properties.

EXAMPLES 12 TO 13

Following the experimental procedure of Examples 1–5, contact lenses are made from compositions using monomers suggested in U.S. Pat. No. 3,808,178 and U.S. Pat. No. 4,152,503 to Gaylord. The physical properties of the lenses obtained from these compositions are given in Table 4.

EXAMPLES 14 TO 17

Following the experimental procedure of Examples 1–5, permeable hard contact lenses are made from similar compositional mixtures whereby mixtures of hydrophilic monomers for wetting effect are employed. The concentration of BME is 0.40%. The modifications and physical properties of the lenses obtained are given in Table 5. All lenses are transparent and colorless.

EXAMPLES 18 TO 20

Following the experimental procedure of Examples 1–5, permeable hard contact lenses are made from similar compositional mixtures whereby mixtures of hydrophilic monomers for wetting effect are used. The BME concentration is 0.40%. The modifications and physical properties of the lenses obtained are given in Table 6. All lenses are transparent and colorless.

Although the preceding examples have been given for clear, colorless materials, the materials may also be prepared having different colored tints. Such colored materials may be obtained by the incorporation of water insoluble, but monomer soluble materials, e.g., a blue color may be had from the addition of D and C green #6.

TABLE 1

| Example # | Composition (wt. %) | | | | | | | | Hardness Shore D | Oxygen[a] Permeability DK (×$10^{11}$) @ 25° C. | Deflection Temperature Underload[b] °C. | Lense Resilience | "Soak"[c] Stake Water Contact Angle |
|---|---|---|---|---|---|---|---|---|---|---|---|---|---|
| | IBMA | VP | Tris | IBuMA | TEGDMA | DEGDMA | EDGMA | BME | | | | | |
| 1 | 27.5 | 12.5 | 45 | 5 | 10 | | | 0.20 | 81 | 18 | 110 | Good | 43° |
| 2 | 27.5 | 12.5 | 45 | 5 | | 10 | | 0.20 | 83 | 23 | 97 | Good | 50° |
| 3 | 22.5 | 12.5 | 45 | 10 | 10 | | | 0.20 | 83 | 20 | 90 | Average | 39° |
| 4 | 30 | 10 | 45 | | 15 | | | 0.20 | 82 | 13 | 92 | Average | 60° |
| 5 | 27.5 | 12.5 | 45 | 10 | | | 5 | 0.20 | 82 | 19 | 85 | Good | 62° |

Units are (cm²/sec)(ml O₂ml mmHg)
[a]Measured using technique of Refojo M. F., Contact & Intraocular Lens Medical J. 3, 27–33, 1977
[b]Taken at onset of deflection
[c]CLMA method using "Soquette" ® as soaking solution
® Barnes-Hind Pharmaceuticals, Inc.

TABLE 2

| Example # | Composition (wt. %) | | | | | | | Hardness Shore D | Oxygen Permeability DK (×$10^{11}$) @ 25° C. | Deflection Temperature Underload °C. | Lense Resilience | "Soak" State Water Contact Angle |
|---|---|---|---|---|---|---|---|---|---|---|---|---|
| | IBMA | VP | Tris | IBuMA | TMPTM | PETMA | BME | | | | | |
| 6 | 30 | 12.5 | 45 | 10 | 2.5 | | 0.20 | 82 | 32 | 100 | Average | 47° |
| 7 | 27.5 | 12.5 | 45 | 10 | | 5 | 0.20 | 82 | 27 | 115 | Average | 45° |
| 8 | 30 | 12.5 | 45 | 10 | | 2.5 | 0.20 | 82 | 30 | 92 | Average | 50° |

TABLE 3

| Example # | Composition (wt. %) | | | | | | Hardness Shore D | Oxygen Permeability DK (×$10^{11}$) @ 25° C. | Deflection Temperature Underload °C. | Lense Resilience | "Soak" State Water Contact Angle |
|---|---|---|---|---|---|---|---|---|---|---|---|
| | IBMA | VP | Tris | IBuMA | TEGDMA | BME | | | | | |
| 9 | 22.5 | 12.5 | 45 | 10 | 10 | 0.02 | 82 | 23 | 76 | Average | 38° |
| 10 | 22.5 | 12.5 | 45 | 10 | 10 | 0.05 | 81 | 27 | 80 | Average | 35° |

TABLE 3-continued

| Example # | Composition (wt. %) | | | | | | Hardness Shore D | Oxygen Permeability DK ($\times 10^{11}$) @ 25° C. | Deflection Temperature Underload °C. | Lense Resilience | "Soak" State Water Contact Angle |
|---|---|---|---|---|---|---|---|---|---|---|---|
| | IBMA | VP | Tris | IBuMA | TEGDMA | BME | | | | | |
| 11 | 22.5 | 12.5 | 45 | 10 | 10 | 0.10 | 83 | 26 | 90 | Average | 45° |

TABLE 4

| Example # | Composition (wt. %) | | | | | | | Hardness Shore D | Oxygen Permeability DK ($\times 10^{11}$) @ 25° C. | Deflection Temperature Underload °C. | Lense Resilience | "Soak" State Water Contact Angle |
|---|---|---|---|---|---|---|---|---|---|---|---|---|
| | Tris | MMA | DMI | MAA | VP | TEGDMA | BME | | | | | |
| 12 | 50 | 30 | | | 10 | 10 | 0.20 | 80 | 18 | 76 | Good | 55° |
| 13 | 41 | 25 | 25 | 4.5 | | 4.5 | 0.20 | 82 | 8 | 75 | Average | 56° |

TABLE 5

| Example # | Composition (wt %) | | | | | | | | | Hardness Shore D | Oxygen Permeability DK × $10^{11}$ @ 25° C. | Deflection temperature Under Load° | "Soak" State Water Contact Angle |
|---|---|---|---|---|---|---|---|---|---|---|---|---|---|
| | IBMA | VP | Tris | TEGDMA | IBAMA | DMAEMA | MAA | PMSG | TMCHMA | | | | |
| 14 | 28 | 6 | 46 | 8 | 5 | 5.5 | 1.5 | | | 81 | 12 | 85 | 41 |
| 15 | 28 | 13 | 31 | 8 | 5 | | | 15 | | 82 | 8 | 90 | 44 |
| 16 | | 13 | 46 | 8 | 5 | | | | 28 | 77 | 15 | 90 | 50 |
| 17 | 28 | 9 | 46 | 8 | 5 | | 4 | | | 82 | 14 | 105 | 44 |

TABLE 6

| Example # | COMPOSITION WT % | | | | | | | | | | Hardness Shore D | Oxygen Permeability DK × $10^{11}$ at 25° C. | Deflection Temperature Under Load °C. | "Soak" State Water Contact Angle |
|---|---|---|---|---|---|---|---|---|---|---|---|---|---|---|
| | IBMA | VP | Tris | TEGDMA | DEGDMA | IBuMA | MMA | DMAEMA | MAA | AA | | | | |
| 18 | 20 | 9 | 45 | 8 | | | 14 | | 4 | | 82 | 12 | 130 | 51° |
| 19 | 20 | 9 | 45 | | 7 | | 15 | | 4 | | 83 | 14 | 135 | 50° |
| 20 | 28 | 9 | 46 | 8 | | 5 | | 2.7 | | 1.3 | 81 | 11 | 95 | 52° |

Appendix to Tables
IBMA — Isobornyl Methacrylate
VP — N—vinyl Pyrrolidone
Tris — Tris (trimethylsiloxy)-α-methacryloxy propylsilane
IBuMA — Isobutyl Methacrylate
DMI — Dimethyl Itaconate
MMA — Methyl Methacrylate
MAA — Methacrylic Acid
TEGDMA — Tetraethylene Glycol Dimethacrylate
DEGDMA — Diethylene Glycol Dimethacrylate
EGDMA — Ethylene Glycol Dimethacrylate
BME — Benzoin Methyl Ether
TMPTM — Trimethylol Propane Trimethacrylate
PETMA — Pentaerythritol Tetramethacrylate
DMAEMA — Dimethylaminoethyl methacrylate
PMSG — Pentamethyldisiloxanyl (propylglycerol) monomethacrylate
TMCHMA — 3,3,5-Trimethylcyclohexyl methacrylate
AA — Acrylic Acid

What is claimed is:

1. A hard oxygen permeable contact lens of concavo-convex shape with the concave surface substantially conforming to the cornea of the eye, fabricated from a material formed by the copolymerization of
   (a) about 9 to 90% by weight of a polymerizable ethylenically unsaturated silicone ester having the following formula:

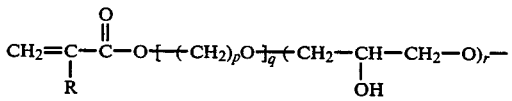

-continued

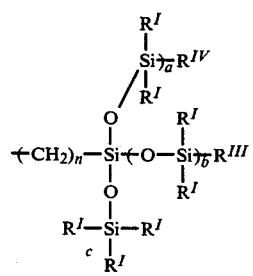

wherein R is hydrogen or methyl; each $R^I$ individually is methyl or $O$—$SiR_3^{II}$; each $R^{II}$ individually is methyl or phenyl; $R^{III}$ is methyl or phenyl, and $R^{IV}$ is methyl or phenyl or $R^{III}$ and $R^{IV}$ together form a bond with a bridging —O— between the Si atom and $R^{III}$ to form a cyclic ring; each a, b, to form a cyclic ring; each a, b, and c individually is an integer of 0–3; p is an integer of 2–4; q is an integer of 0–10; n is an integer of 1–3; and r is an integer of 0–1;

(b) about 5 to about 90% by weight of a polymerizable ethylenically unsaturated ester selected from the group of isobornyl methacrylate, isobornyl acrylate, isobornyl crotonate, dicyclopentadienyl methacrylate, dicyclopentadienyl acrylate, dicyclopentadienyl crotonate, isopinocamphyl methacrylate, isopinocamphyl acrylate, isopinocamphyl crotonate, t-butylcyclohexyl methacrylate, 5-butylcyclohexyl crotonate, 3,3,5-trimethylcyclohexyl methacrylate, 3,3,5-trimethylcyclohexyl acrylate, 3,3,5-trimethylcyclohexyl crotonate, neopentyl methacrylate, neopentyl acrylate, neopentyl crotonate, or mixtures thereof;

(c) about 1 to 30% by weight of a hydrophilic monomer for wettability selected from the group of 2-hydroxyethyl acrylate, 2-hydroxyethyl methacrylate, acrylic acid, methacrylic acid, N-vinyl pyrrolidone, maleic anhydride, acrylamide, methacrylamide, N,N-dimethylacrylamide, glyceryl acrylate, glyceryl methacrylate, dimethylaminoethyl methacrylate, dimethylaminoethyl acrylate, polyethyleneglycol monoacrylates and polyethylene glycol monomethacrylates and their corresponding methyl ethers thereof, or mixtures thereof;

(d) about 0–20% by weight of a cross-linking agent selected from the group of acrylate and methacrylate diesters of a compound selected from the group of dihydric alcohols, polyhydric alcohols, and phenols; methylene bisacrylamide; methylene bismethacrylamide; hexamethylene bisacrylamide; hexamethylene bismethacrylamide; divinyl esters; diallyl esters; or mixtures thereof;

(e) about 0 to 20% by weight of a $C_2$–$C_{20}$ straight or branched aliphatic monoester or diester of an ethylenically unsaturated carboxylic acid.

2. The contact lens of claim 1 wherein the amount of said silicone ester is about 40 to 60% by weight; the amount of said ester (b) is about 10 to 40% by weight; the amount of said hydrophilic monomer is about 1 to 30% by weight; the amount of said cross-linking agent is about 1 to 20% by weight; and the amount of such ester (e) is about 1 to 20% by weight.

3. The contact lens of claim 2 wherein the amount of said crosslinking agent is about 2 to 15% by weight; and the amount of said ester (e) is about 5 to 10%.

4. The contact lens of claim 1 wherein the amount of said silicone ester is about 40 to 50% by weight; the amount of said ester (b) is about 15 to 35% by weight; the amount of said hydrophilic monomer is about 2 to 15% by weight; the amount of said crosslinking agent is about 5 to 15% by weight; and the amount of said ester (e) is about 5 to 15% by weight 5. The contact lens of claim 1 wherein said silicone ester is tris(trimethylsiloxy)-α-methacryloxypropylsilane.

6. The contact lens of claim 1 wherein said ester (b) is isobornyl methacrylate.

7. The contact lens of claim 1 wherein said hydrophilic monomer is N-vinylpyrrolidone.

8. A process for polymerizing a composition containing:

(a) about 9 to 90% by weight of a polymerizable ethylenically unsaturated silicone ester having the following formula:

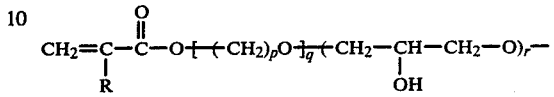

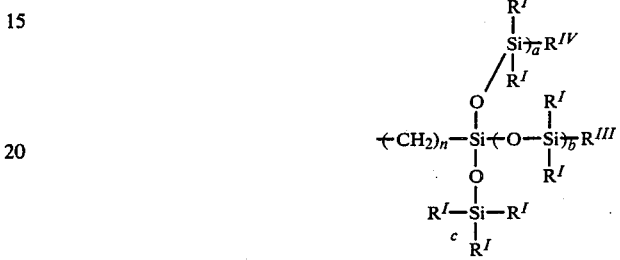

wherein R is hydrogen or methyl; each $R^I$ individually is methyl or $O$—$SiR_3^{II}$; each $R^{II}$ individually is methyl or phenyl; $R^{III}$ is methyl or phenyl, and $R^{IV}$ is methyl or phenyl or $R^{III}$ and $R^{IV}$ together form a bond with a bridging —O— between the Si atom and $R^{III}$ to form a cyclic ring; each a, b, and c individually is an integer of 0–3; p is an integer of 2–4; q is an integer of 0–10; n is an integer of 1–3; and r is an integer of 0–1.

(b) about 5 to about 90% by weight of a polymerizable ethylenically unsaturated ester selected from the group of isobornyl methacrylate, isobornyl acrylate, isobornyl crotonate, dicyclopentadienyl methacrylate, dicyclopentadienyl acrylate, dicyclopentadienyl crotonate, isopinocamphyl methacrylate, isopinocamphyl acrylate, isopinocamphyl crotonate, t-butylcyclohexyl methacrylate, 5-butylcyclohexyl crotonate, 3,3,5-trimethylcyclohexyl methacrylate, 3,3,5-trimethylcyclohexyl acrylate, 3,3,5-trimethylcyclohexyl crotonate, neopentyl methacrylate, neopentyl acrylate, neopentyl crotonate, or mixtures thereof;

(c) about 1 to 30% by weight of a hydrophilic monomer for wettability selected from the group of 2-hydroxyethyl acrylate, 2-hydroxyethyl methacrylate, acrylic acid, methacrylic acid, N-vinyl pyrrolidone, maleic anhydride, acrylamide, methacrylamide, N,N-dimethylacrylamide, glyceryl acrylate, glyceryl methacrylate, dimethylaminoethyl methacrylate, dimethylaminoethyl acrylate, polyethylene glycol monoacrylates and polyethylene glycol monomethacrylates and their corresponding methyl ethers thereof, or mixtures thereof;

(d) about 0–20% by weight of a cross-linking agent selected from the group of acrylate and methacrylate diesters of a compound selected from the group of dihydric alcohols, polyhydric alcohols, and phenols; methylene bisacrylamide; methylene bismethacrylamide; hexamethylene bisacrylamide; hexamethylene bismethacrylamide; divinyl esters; diallyl esters; or mixtures thereof;

(e) about 0 to 20% by weight of a $C_2$–$C_{20}$ straight or branched aliphatic monoester or diester of an ethylenically unsaturated carboxylic acid.

9. The process of claim 8 wherein said ultraviolet light is in the range of about 200 to about 400 mm.

10. The process of claim 8 which further includes subjecting the composition after irradiation to elevated temperature of about 80° to 140° C.

11. The process of claim 10 wherein said temperature is about 80° to about 120° C.

12. The process of claim 8 wherein said composition is subjected to heating for about 1 to 7 hours.

13. The process of claim 8 wherein said composition is subjected to heating for about 1 to about 3 hours.

14. The process of claim 8 wherein said composition includes a photoinitiator or photosensitizer.

15. The process of claim 8 wherein said composition includes a benzoin ether in amount of about 0.01 to 2% by weight.

16. The process of claim 8 wherein said composition includes a benzoin methyl ether in amount of about 0.01 to 1% by weight.

17. The process of claim 8 wherein said composition includes a thermal-free radical initiator.

18. The process of claim 17 wherein said initiator is selected from the group of t-butyl peroctoate, dilauryl peroxide, azobisisobutyronitrile, or mixtures thereof.

19. The process of claim 17 wherein the amount of said initiator is about 0.01 to about 2% by weight.

20. The process of claim 17 wherein the amount of said initiator is about 0.01 to about 1% by weight.

* * * * *